United States Patent
Tay et al.

(10) Patent No.: US 11,592,833 B2
(45) Date of Patent: Feb. 28, 2023

(54) METHOD FOR UPDATING A LOCALIZATION MAP FOR A FLEET OF AUTONOMOUS VEHICLES

(71) Applicant: Direct Current Capital LLC, Wilmington, DE (US)

(72) Inventors: Kah Seng Tay, Mountain View, CA (US); Xiaotian Chen, Mountain View, CA (US); Xin Sun, Mountain View, CA (US); Vishisht Gupta, Mountain View, CA (US)

( * ) Notice: Subject to any disclaimer, the term of this patent is extended or adjusted under 35 U.S.C. 154(b) by 530 days.

(21) Appl. No.: 16/400,893

(22) Filed: May 1, 2019

(65) Prior Publication Data

US 2019/0339709 A1 Nov. 7, 2019

Related U.S. Application Data

(60) Provisional application No. 62/667,391, filed on May 4, 2018.

(51) Int. Cl.
| | |
|---|---|
| G05D 1/02 | (2020.01) |
| G06F 16/29 | (2019.01) |
| G06F 16/23 | (2019.01) |
| G06Q 10/02 | (2012.01) |
| G06Q 50/30 | (2012.01) |
| G05D 1/00 | (2006.01) |

(52) U.S. Cl.
CPC ......... *G05D 1/0274* (2013.01); *G05D 1/0088* (2013.01); *G06F 16/23* (2019.01); *G06F 16/29* (2019.01); *G06Q 10/02* (2013.01); *G06Q 50/30* (2013.01); *G05D 2201/0213* (2013.01)

(58) Field of Classification Search
CPC .............. G05D 1/0274; G05D 1/0088; G05D 2201/0213; G06F 16/23; G06F 16/29; G06Q 10/02; G06Q 50/30; G01C 21/3438; G01C 21/32; G01C 21/34
USPC ........................................... 701/23
See application file for complete search history.

(56) References Cited

U.S. PATENT DOCUMENTS

| | | | |
|---|---|---|---|
| 10,809,081 B1 * | 10/2020 | Kentley-Klay | G08G 1/202 |
| 10,837,788 B1 * | 11/2020 | Kentley-Klay | G01C 21/3438 |
| 2017/0132934 A1 * | 5/2017 | Kentley | G08G 1/202 |
| 2018/0216942 A1 * | 8/2018 | Wang | G01S 7/4808 |
| 2018/0341022 A1 * | 11/2018 | Guo | G01S 7/4808 |
| 2019/0137287 A1 * | 5/2019 | Pazhayampallil | G06F 16/29 |

* cited by examiner

*Primary Examiner* — Krishnan Ramesh
(74) *Attorney, Agent, or Firm* — Polsinelli PC

(57) ABSTRACT

One variation of a method for updating a localization map for a fleet of autonomous vehicles includes: selecting a set of roads including a first subset of road segments associated with existing incomplete scan data and a second subset of road segments associated with a monitoring request from an external entity; during a passenger period at the autonomous vehicle, autonomously transporting passengers according to a series of ride requests; during a mapping period succeeding the passenger period at the autonomous vehicle, autonomously navigating along the set of road segments, recording a first series of scan data representing surfaces proximal the first subset of road segments, and recording a second series of scan data representing surfaces proximal the second subset of road segments; updating the localization map based on the first series of scan data; and serving the second series of scan data to the external entity.

20 Claims, 5 Drawing Sheets

METHOD FOR UPDATING A LOCALIZATION MAP FOR A FLEET OF AUTONOMOUS VEHICLES

CROSS-REFERENCE TO RELATED APPLICATIONS

This application claims the benefit of U.S. Provisional Application No. 62/667,391, filed on 4 May 2018, which is incorporated in its entirety by this reference.

TECHNICAL FIELD

This invention relates generally to the field of autonomous vehicles and more specifically to a new and useful method for updating a localization map for a fleet of autonomous vehicles in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
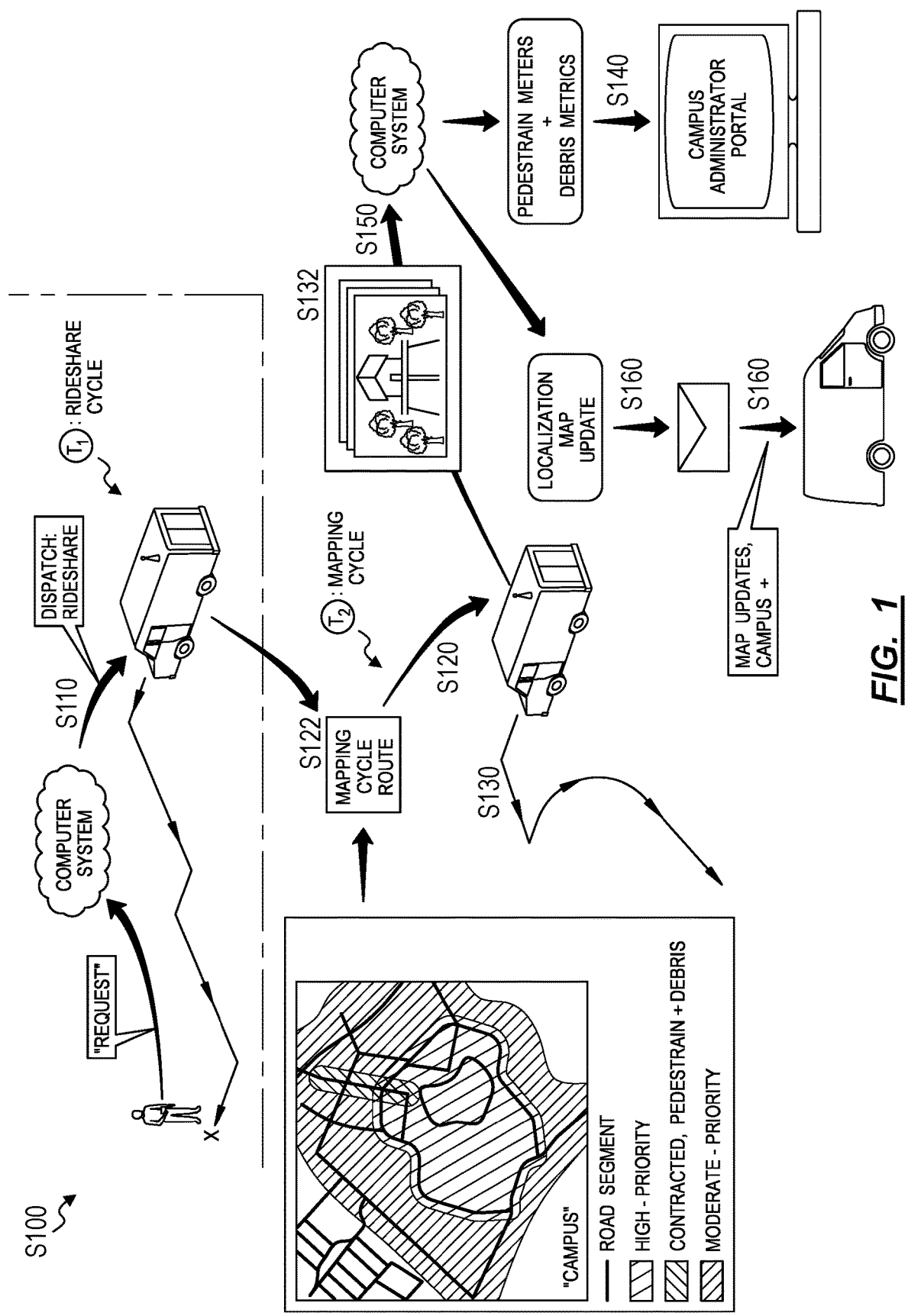
FIG. 1 is a flowchart representation of a method.
Figure 2A:
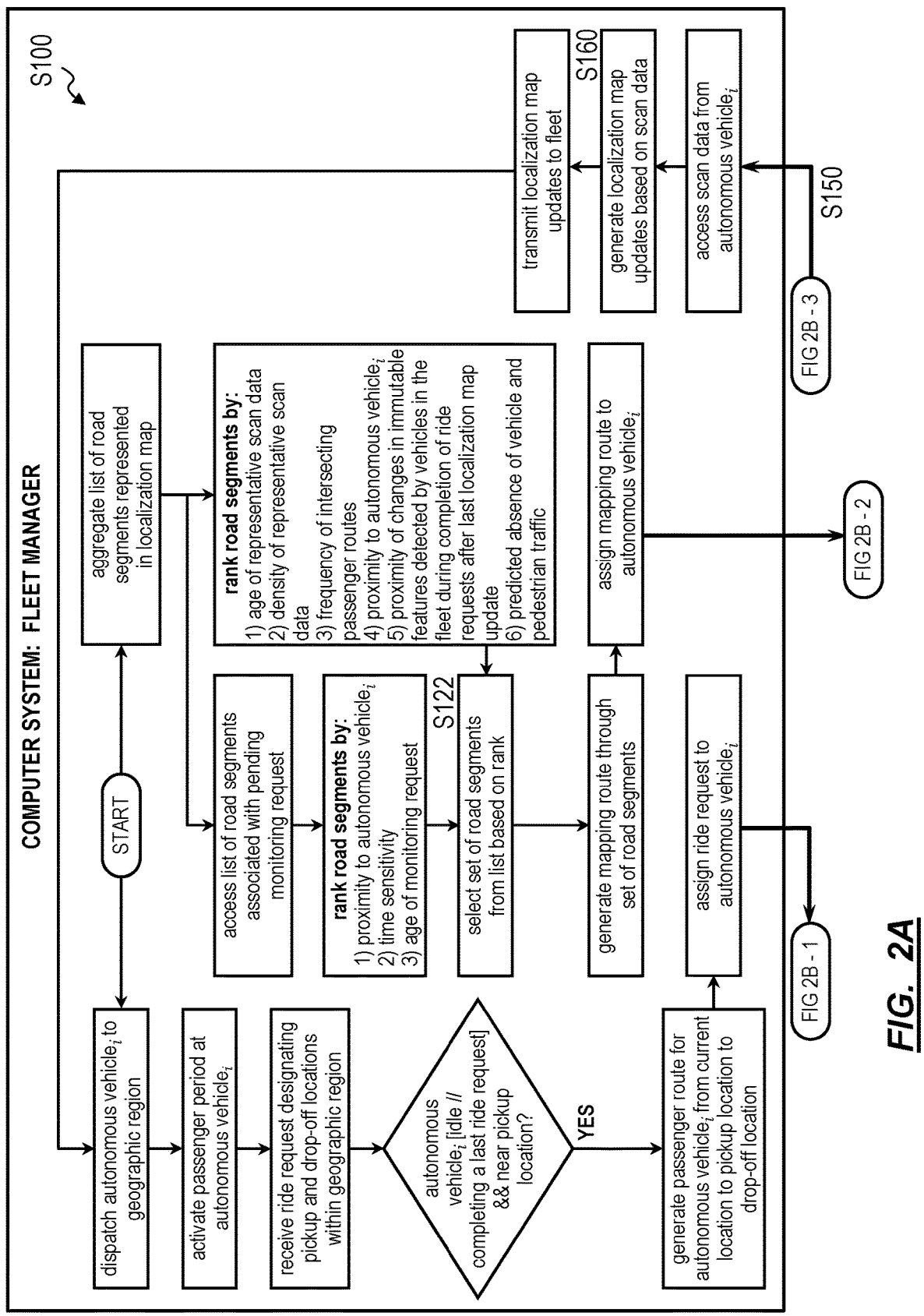
FIG. 2 is a flowchart representation of one variation of the method.
Figure 2B:
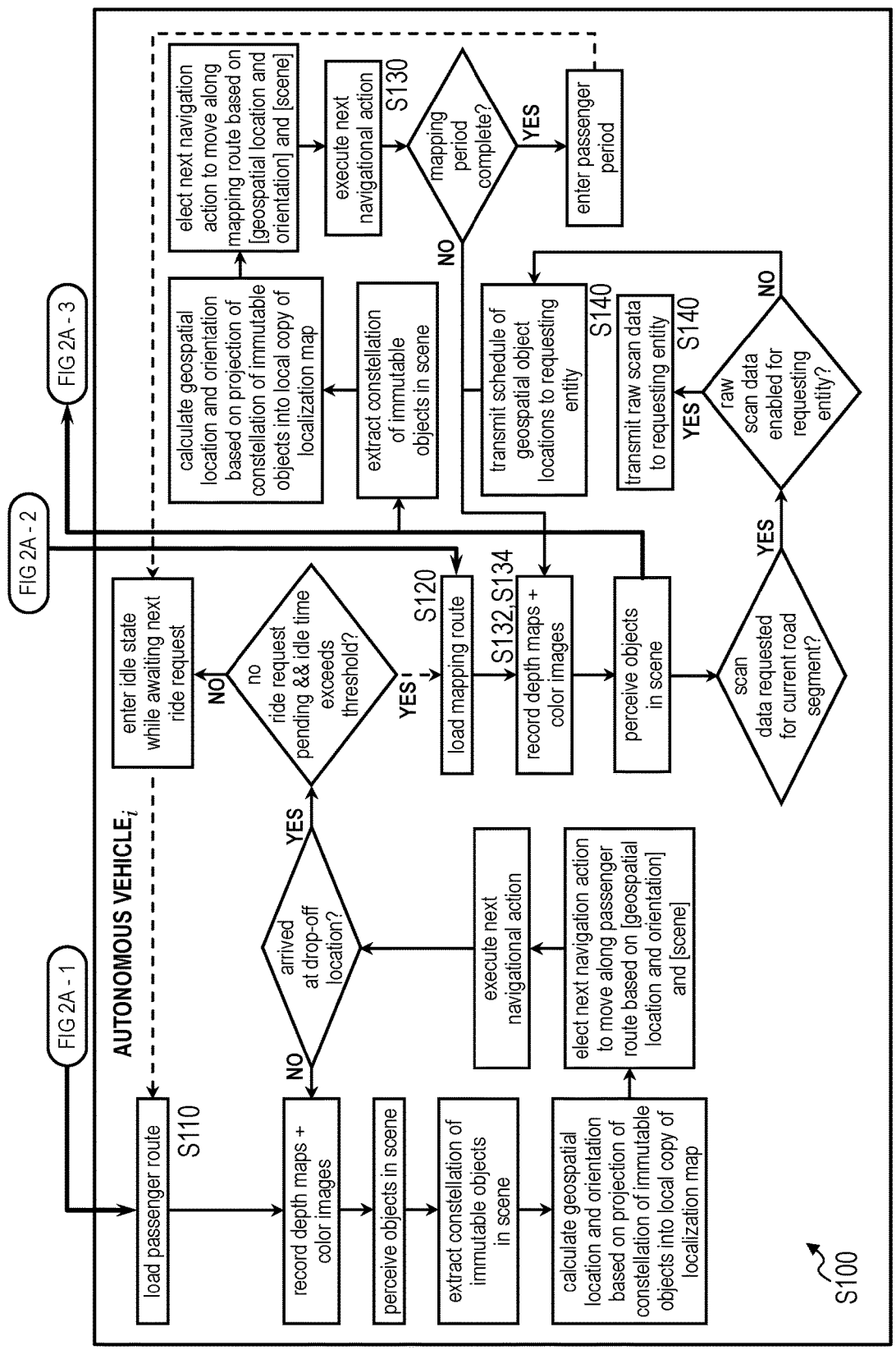

As shown in FIGS. 1 and 2, a method for updating a localization map for a fleet of autonomous vehicles includes: defining a set of road segments for scanning by an autonomous vehicle during a first mapping period in Block S122, the set of road segments located within a geographic region, comprising a first subset of road segments associated with existing incomplete scan data, and comprising a second subset of road segments associated with a monitoring request from an external entity; during a first passenger period at the autonomous vehicle, autonomously transporting passengers within the geographic region according to a first series of ride requests in Block S110; during the first mapping period succeeding the first passenger period at the autonomous vehicle, autonomously navigating along the set of road segments in Block S130, recording a first series of scan data representing surfaces proximal the first subset of road segments in Block S132, and recording a second series of scan data representing surfaces proximal the second subset of road segments in Block S132; generating a set of updates for the localization map representing the geographic region based on the first series of scan data recorded by the autonomous vehicle in Block S160; and serving a form of the second series of scan data to the external entity in Block S140.

As shown in FIG. 1, another variation of the method S100 includes, at a computer system: during a passenger period, dispatching an autonomous vehicle to complete a series of ride requests within a geographic region in Block S110; defining a set of road segments for scanning by the autonomous vehicle in Block S122, the set of road segments located within the geographic region, comprising a first subset of road segments associated with existing scan data older than a threshold age, and comprising a second subset of road segments contracted for monitoring by an external entity; and dispatching the autonomous vehicle to scan the set of road segments during a mapping period in Block S120. This variation of the method S100 also includes, at the autonomous vehicle during the mapping period: autonomously navigating along the set of road segments in Block S130; recording a first series of scan data representing surfaces proximal the first subset of road segments in Block S132; and recording a second series of scan data representing surfaces proximal the second subset of road segments in Block S132. This variation of the method S100 further includes: at the autonomous vehicle, returning the first and second series of scan data to the computer system in Block S150; and, at the computer system, updating a localization map for the geographic region based on the first and second series of scan data received from the autonomous vehicle in Block S160, returning updates for the localization map to the autonomous vehicle in Block S160, and returning the second series of scan data to the external entity in Block S140.

A similar variation of the method S100 shown includes, at a computer system: dispatching an autonomous vehicle to complete a first series of ride requests within a geographic region during a first passenger period in Block S110; defining a set of road segments for scanning by the autonomous vehicle during a first mapping period in Block S122, the set of road segments located within the geographic region, comprising a first subset of road segments associated with existing incomplete scan data, and comprising a second subset of road segments associated with a monitoring request from an external entity; and, following conclusion of the first passenger period, dispatching the autonomous vehicle to scan the set of road segments during the first mapping period in Block S120. This variation of the method S100 also includes, at the autonomous vehicle, during the first mapping period: autonomously navigating along the set of road segments in Block S130; recording a first series of scan data representing surfaces proximal the first subset of road segments in Block S132; and recording a second series of scan data representing surfaces proximal the second subset of road segments in Block S132. This variation of the method S100 further includes: generating a set of updates for the localization map representing the geographic region based on the first series of scan data recorded by the autonomous vehicle in Block S160; and serving the second series of scan data to the external entity in Block S140.

Another variation of the method S100 includes, at a computer system: during a passenger period, dispatching an autonomous vehicle to complete a series of ride requests within a geographic region in Block S110; and dispatching the autonomous vehicle to scan a set of road segments within the geographic region during a mapping period in Block S120. This variation of the method S100 also includes, at the autonomous vehicle, during the mapping period: autonomously navigating along the set of road segments in Block S130; recording scan data of surfaces proximal the set of road segments in Block S132; scanning the scan data for emergency conditions proximal the autonomous vehicle in Block S140; and, in response to detecting an emergency condition in the scan data, streaming a subset of the scan data to an emergency dispatcher in Block S140. This variation of the method S100 further includes, at the autonomous vehicle, returning the scan data to the computer system in Block S150; and, at the computer system, updating a localization map for the geographic region based on the scan data received from the autonomous vehicle and returning updates for the localization map to the autonomous vehicle in Block S160.

Yet another variation of the method S100 includes, at a computer system: during a passenger period, dispatching an autonomous vehicle to complete a series of ride requests within a geographic region in Block S110; and dispatching the autonomous vehicle to scan a set of road segments within the geographic region during a mapping period in Block S120. This variation of the method S100 also includes, at the autonomous vehicle during the mapping period: autonomously navigating along the set of road segments in Block S130; recording a first series of scan data representing surfaces proximal the set of road segments in Block S132; and, in response to receipt of an emergency request specifying a location proximal the autonomous vehicle, autonomously navigating toward the location, recording a second series of scan data representing surfaces proximal the location, and streaming the second series of scan data to an emergency dispatcher in Block S140. This variation of the method S100 further includes: at the autonomous vehicle, returning the first series of scan data to the computer system in Block S150; and, at the computer system, updating a localization map for the geographic region based on the scan data received from the autonomous vehicle and returning updates for the localization map to the autonomous vehicle in Block S160.

2. Applications

Generally, Blocks of the method S100 can be executed by a computer system (e.g., a remote server) and an autonomous vehicle: to autonomously transport people throughout a geographic region according to ride requests during periods of higher rideshare demand (or "passenger periods," such as during daytime periods); to autonomously collect new scan data representing road segments throughout this geographic region during periods of lower rideshare demand (or "mapping periods," such as during nighttime periods); to update a localization map of the geographic region for the autonomous vehicle based on these new scan data; and to push localization map updates back to the autonomous vehicle, which may enable the autonomous vehicle to determine its location and orientation faster, more accurately, and/or with greater confidence when executing subsequent ride requests.

During a mapping period, the autonomous vehicle can therefore record new scan data representing a current state of select road segments in its assigned geographic region, such as road segments located at common pickup and drop-off locations and intersecting common routes in recent ride requests. The computer system can then access these scan data to update a localization map for this geographic region to reflect the current state of these select road segments and push localization map updates to autonomous vehicles operating in this geographic region accordingly.

However, while recording scan data during a mapping period, the autonomous vehicle can also passively record data that is relevant or valuable to other entities, such as: law enforcement; emergency responders; local governments and municipalities; local security staff; etc. For example, the autonomous vehicle can: implement computer vision, artificial intelligence, deep learning, and/or other perception techniques to detect a fire nearby while traversing a road segment during a mapping period; capture a 2D color image or video clip of this detected fire; and then automatically transmit the 2D color image or video clip, a location of the autonomous vehicle or the detected fire, a time of the detected fire, and a request for review to an emergency responder or emergency dispatcher for assistance. The autonomous vehicle can stop near the detected fire and stream video of the detected fire to the emergency responder or emergency dispatcher (or to any other remote human operator) until the detected fire is manually cleared, until the fire is no longer detected, or for a (predetermined) maximum duration of five minutes. In a similar example, the autonomous vehicle can: implement similar methods and techniques to detect a road accident while traversing road segments during a mapping period; capture a 2D color image or video clip of this detected accident; and then automatically transmit the 2D color image or video clip, a location of the autonomous vehicle or the detected accident, a time of the detected accident, and a request for review to an emergency responder or emergency dispatcher for assistance. In another example, during a mapping period, the autonomous vehicle can: compare 3D depth maps recorded by the autonomous vehicle to immutable features represented in a local copy of the current localization map stored on the autonomous vehicle in order to isolate deviations from past locations and geometries of known immutable objects; implement computer vision, artificial intelligence, deep learning, or other techniques to identify such deviations as downed trees, downed power or telephone lines, or damaged or missing road signs; and then automatically transmit types, locations, and 2D color images of these detected deviations to municipal staff, a road maintenance crew, a power company, or a communications company. The autonomous vehicle and/or the computer system can therefore selectively distribute (or "push") scan data to various external entities when the autonomous vehicle or computer system detects events or features that may be relevant to such external entities.

Additionally or alternatively, external entities may request scan data of certain road segments or certain locations near road segments in the geographic region, such as in real-time or ahead of a scheduled mapping period by the autonomous vehicle. The autonomous vehicle and/or the computer system can then define a route along road segments designated internally for rescanning and along road segments or locations specified in scan requests by external entities; the autonomous vehicle can then autonomously navigate and collect scan data along this route; and the autonomous vehicle and/or the computer system can return requested scan data to these external entities accordingly, such as in real-time or upon conclusion of the mapping period. For example, the autonomous vehicle can autonomously complete on-demand ride requests during a passenger period, including autonomously: navigating to pickup locations; collecting passengers at these pickup locations, autonomously navigating along planned routes to specified drop-off locations; and delivering passengers at these drop-off locations according to their ride requests. The autonomous vehicle can then transition into a mapping period during a scheduled interval in order: to collect timely data requested by external entities (e.g., vehicle count along a road segment at 4:30 AM on a Tuesday just prior to scheduled 5 AM street cleaning; to count vehicles in an overnight parking lot at 12 AM on weekdays; to count pedestrians at 11:30 PM outside of a concert hall at scheduled conclusion of a performance; to detect pedestrians during scheduled curfew periods within a gated community or campus); and to collect scan data for internal localization map updates (e.g., during a periods of low expected vehicle and pedestrian traffic along road segments represented by older or outdated scan data in the current localization map). Therefore, the computer system and the autonomous vehicle can cooperate to support on-demand ride requests from riders and to surveil roads segments of interest for internal localization map updates and for external entities during scheduled mapping periods.

Furthermore, the autonomous vehicle and/or the computer system can pull a location of interest within a geographic region from a feed of an external entity (e.g., an emergency responder requesting a video feed of an accident, a private individual requesting an occupancy count on a patio at a busy brunch location) and modify a predefined route for the current mapping period to reflect this location of interest in real-time. The autonomous vehicle can then autonomously navigate along this revised route and collect scan data accordingly, and the autonomous vehicle and/or the computer system can return these scan data recorded near this location of interest to the corresponding external entity, such as in (near) real-time.

The autonomous vehicle can therefore execute Blocks of the method S100: to transition from completing ride requests to executing a mapping period; to collect scan data for road segments within its assigned geographic region—which the computer system can then access to update a localization map for the geographic region—during a mapping period; and to opportunistically collect data—during the mapping period—that may be useful or relevant to one or more external entities.

Furthermore, the computer system can execute Blocks of the method S100 to define and modify a route executed by the autonomous vehicle during a mapping period in order: to enable collection of internal scan data for localization map updates that support improved future operation of the same and other autonomous vehicles; and to supply external entities with requested and/or relevant information (e.g., raw scan data and/or derived data, such as vehicle and pedestrian counts). Accordingly, the computer system can: update the localization map based on scan data collected by the autonomous vehicle during a mapping period; push localization map updates to the autonomous vehicle and other autonomous vehicles operating in this same geographic region; and selectively distribute raw or compressed scan data to targeted external entities that may benefit from these data or who previously contracted for such data.

(In one variation, the autonomous vehicle can implement similar methods and techniques to collect and selectively distribute scan data to various external entities while operated in a manual mode rather than in an autonomous mode.)

3. Autonomous Vehicle and Data Collection

Generally, the autonomous vehicle can include: a suite of sensors configured to collect information about the autonomous vehicle's environment; local memory storing a navigation map defining lane connections and nominal vehicle paths for a road area and a localization map that the autonomous vehicle implements to determine its location in real space; and a controller. While the autonomous vehicle is in operation, the controller can: calculate a nominal path between the autonomous vehicle's current location and a destination based on the navigation map; determine the location of the autonomous vehicle in real space over time based on sensor data collected from the suite of sensors and the localization map; determine the context of a scene around the autonomous vehicle based on these sensor data; elect a next navigational action (e.g., a navigational decision) to remain on or deviate from the nominal path based on the context of the scene around the autonomous vehicle and the real geospatial location of the autonomous vehicle; and control actuators within the autonomous vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and external surface within the field of view of the LIDAR sensor—per rotation of the LIDAR sensor. The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, left lateral, and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, the controller can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration (e.g., accelerator position), or deceleration (e.g., brake position)—to move the autonomous vehicle toward a specified destination based on the autonomous vehicle's current position and the scene around the autonomous vehicle. For example, the autonomous vehicle can pass the autonomous vehicle's position, types and locations of dynamic objects in the scene nearby, and the autonomous vehicle's destination or planned route into a path planning system in order to calculate a next navigational action and then autonomously execute this next navigational action accordingly.

In a similar example, when navigating autonomously during both passenger and mapping periods, the autonomous vehicle can: record a depth map and a color image depicting surfaces proximal the autonomous vehicle; extract a constellation of features from the depth map; calculate a geospatial location and orientation of the autonomous vehicle that aligns the constellation of features with corresponding features contained in a local copy of the localization map; implement computer vision, artificial intelligence, and/or other perception techniques to detect and identify objects in the scene around the autonomous vehicle based on both the depth map and the color image; elect a next navigational action based on the geospatial location and orientation of the autonomous vehicle, types and locations of objects nearby, and a current route assigned to the autonomous vehicle; autonomously execute this the next navigational action; and regularly repeat this process, such as a rate of 20 Hz throughout autonomously operation.

However, the autonomous vehicle can implement any other methods or techniques to determine its location, perceive its surroundings, select next navigational actions, and execute these next navigational actions.

4. Rideshare

Figure 3A:
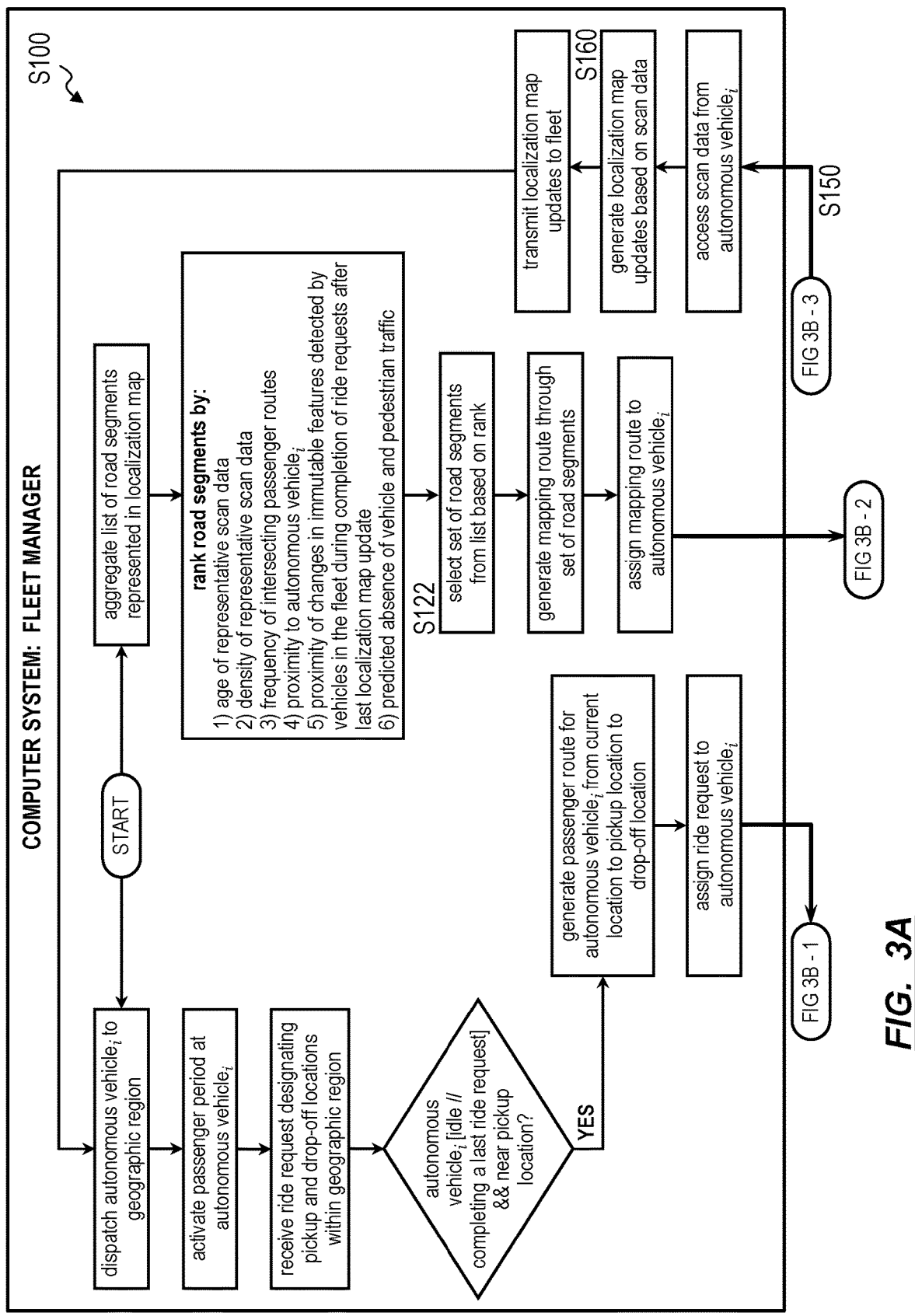
FIG. 3 is a flowchart representation of one variation of the method.
Figure 3B:
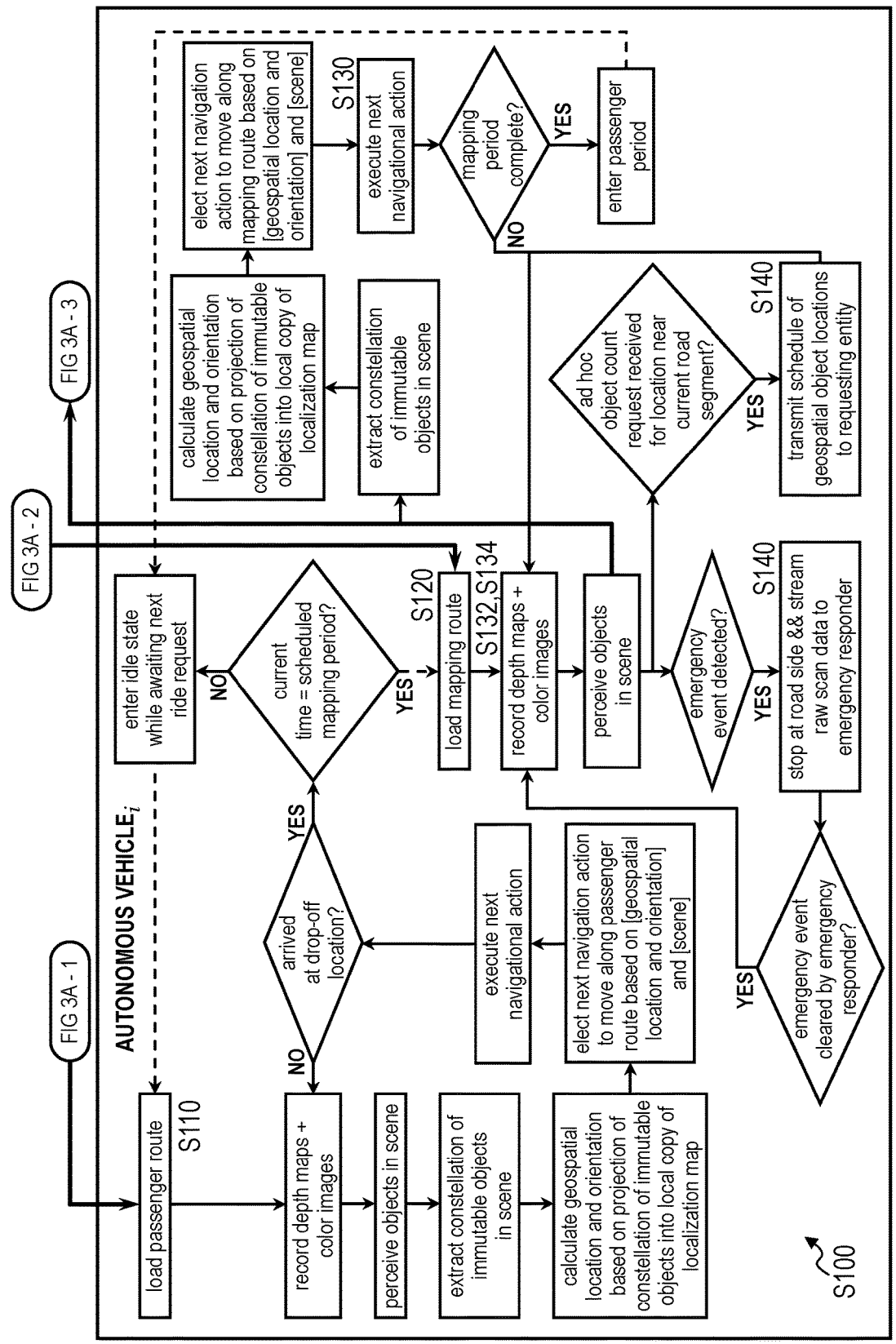

Block S110 of the method S100 recites, at the computer system: dispatching the autonomous vehicle to complete a series of ride requests within a geographic region during a passenger period. (Block S110 can similarly recite, during a first passenger period at the autonomous vehicle, autonomously transporting passengers within the geographic region according to a first series of ride requests.) Generally, in Block S110, the computer system can: interface with users to receive ride requests, such as through native rideshare applications executing on these users' smartphones; and distribute these ride requests to autonomous vehicles within a fleet, such as based on availability and proximity of these autonomous vehicles to pickup locations specified in these ride requests, as shown in FIGS. 2 and 3.

For example, a user can enter a ride request through an instance of the native rideshare application executing on her smartphone. The native rideshare application can then upload this ride request to the computer system, which—functioning as a remote dispatcher—can identify an autonomous vehicle that is near the user's specified pickup location and available or in the process of completing another route near this pickup location; the computer system can then assign this autonomous vehicle to the user's ride request and generate a route between the pickup and drop-off locations specified in this ride request. The remote dispatcher can then dispatch this autonomous vehicle to the specified pickup location by the user; and the autonomous vehicle can autonomously navigate to this location, collect the user, and autonomously navigate along the planned route to the specified drop-off location.

However, the computer system can implement any other methods or techniques to access ride requests and to assign these ride requests to autonomous vehicles within the autonomous vehicle fleet in Block S110. The autonomous vehicle can then implement any other method or technique to autonomously execute its assigned ride requests, such as described in U.S. patent application Ser. Nos. 16/234,307 and 16/264,566, which are incorporated in their entireties by this reference.

5. Mapping Period Triggers

Block S120 of the method S100 recites dispatching the autonomous vehicle to scan a set of road segments within the geographic region during a mapping period. Generally, in Block S120, the computer system can selectively trigger the autonomous vehicle to transition: from passenger periods in which the autonomous vehicle autonomously transports human riders between pickup and drop-off locations according to ride requests; to mapping periods in which the autonomous vehicle autonomously navigates along select road segments and collects new scan data for localization map updates and/or distribution of information to relevant external entities.

5.1 Fixed Schedule

In one implementation shown in FIG. 2, the computer system (or the autonomous vehicle) implements predefined passenger periods and mapping periods (or "mapping windows"). For example, the computer system can automatically trigger the autonomous vehicle to transition from executing passenger periods during the day to executing a mapping period at night, including executing mapping periods: from 9 PM up to 4 AM on Monday, Tuesday, and Wednesday nights; from 10 PM up to 4 AM on Thursday nights; from 1 AM up to 6 AM on Friday and Saturday nights; and from 8 PM up to 5 AM on Sunday nights. In this implementation, rideshare demand may be low and traffic may be limited during these nighttime periods. In particular, less pedestrian and vehicle traffic may yield fewer obstructions between the autonomous vehicle and immutable objects nearby (e.g., non-movable or static lane markers, curbs, sidewalks, road signs, building facades), thereby enabling the autonomous vehicle to capture scan data that depict higher densities of immutable features with greater clarity along these road segments of interest. These higher-quality scan data captured by the autonomous vehicle during low traffic periods may then enable the computer system to generate localization map updates containing high-resolution, higher-precision, and more feature-dense depictions of immutable features along these road segments. Furthermore, by triggering the autonomous vehicle to execute mapping periods rather than passenger periods at night, the computer system can limit impact on response time for ride requests by autonomous vehicles within the fleet.

In a similar example, the computer system can: access historical pedestrian and vehicle occupancy data for road segments of interest assigned to the autonomous vehicle (i.e., the first subset of road segments described above); define a time window for a next mapping period by the autonomous vehicle concurrent with times of low historical pedestrian and vehicle occupancy within these road segments of interest; and then queue the autonomous vehicle to initiate the next mapping period within this time window. Later, given absence of pending ride requests originating within a threshold distance of the autonomous vehicle or if the autonomous vehicle is otherwise idle or not assigned to a pending ride request when this time window is current, the autonomous vehicle can automatically transition from a passenger period into this mapping period and scan the designated road segments of interest accordingly. The computer system can then access scan data collected by the autonomous vehicle during this mapping period, update the localization map based on these scan data as described below, and push these localization map updates to the autonomous vehicle (and other autonomous vehicles in the fleet) before the autonomous vehicle transitions back to executing ride requests during a next passenger period.

5.2 Dynamic Passenger and Mapping Periods

In another implementation shown in FIG. 3, the computer system can implement dynamic triggers to transition the autonomous vehicle from executing passenger periods to executing mapping periods. For example, the computer system can trigger the autonomous vehicle to execute a mapping period: if the current time falls within a predefined mapping window; and if either no ride requests originating within a threshold distance of the autonomous vehicle are currently pending or if the autonomous vehicle has been idle for more than a threshold duration of time (e.g., ten minutes). Additionally or alternatively, the computer system can trigger the autonomous vehicle to execute a mapping period if the autonomous vehicle is currently idle and: if the autonomous vehicle currently detects less than a threshold density of traffic in its vicinity; if the autonomous vehicle is within a threshold distance of a road segment previously flagged for mapping, such as described below; if fewer than a threshold number of autonomous vehicles within the fleet are currently executing mapping periods; and/or if more than a threshold number of other autonomous vehicles are available in the geographic region to perform passenger periods (e.g., proportional to population density and historical rideshare demand in the geographic region); etc.

In the foregoing implementations, the autonomous vehicle can also automatically transition from executing passenger periods to executing a mapping period responsive to any of the foregoing fixed or dynamic triggers.

6. Preplanned Mapping Locations

The method S100 can also include Block S122, which recites defining a set of road segments for scanning by a autonomous vehicle during a first mapping period, wherein the set of road segments is located within a geographic region, includes a first subset of road segments associated with existing incomplete scan data, and includes a second subset of road segments associated with a monitoring request from an external entity. Generally, in Block S122, the computer system can identify a set of road segments of interest for which current scan data may be most essential for a next localization map update or for which scan data was previously requested or contracted by an external entity, as shown in FIG. 2.

In particular, in Block S122, the computer system can: generate a list of road segments of interest, such as including road segments that are highly trafficked, have not been scanned recently, and/or that have been contracted for additional monitoring by an external entity; calculate a route through these road segments of interest; and then push this route to the autonomous vehicle for autonomous execution during the current or upcoming mapping period. In another implementation, the computer system generates a ranked list of road segments—such as a ranked list of 100-meter-long road segments—within range of the autonomous vehicle and pushes this list to the autonomous vehicle in Block S122. The autonomous vehicle can then locally calculate a route predicted to maximize a value of road segments traversed by the autonomous vehicle per unit time during the current or upcoming mapping period.

6.1 Road Segments for Internal Localization Map Refinement

In one implementation, the computer system ranks road segments in the autonomous vehicle's assigned geographic region based on a set of factors, such as: proportional to a frequency with which these road segments are traversed by autonomous vehicles in the fleet; proportional to proximity to the autonomous vehicle's current location (or location at the start of the autonomous vehicle's next mapping period); based on whether a change in an immutable feature (e.g., a lane marker, lane reflector, curb, road sign, telephone pole, tree, construction site, or building façade etc.) along or adjacent a road segment was detected by the same or other autonomous vehicle while executing a recent passenger period; based on the type and degree of a change in an immutable feature recently detected along or adjacent a road segment; proportional to a speed limit assigned to a road segment; and/or proportional to historical vehicle or pedestrian traffic along a road segment, etc. The computer system can then select a subset of road segments in the geographic region based on these historical data and assign these road segments to the autonomous vehicle for scanning during a next mapping period.

In one implementation shown in FIG. 2, the remote computer system: accesses a list of road segments within the geographic region; retrieves timestamps of last scan data of the road segments captured during dedicated mapping periods and/or captured during periods of low pedestrian and vehicle traffic; ranks road segments, in the list of road segments, based on age of such existing scan data representing these road segments; and selects a subset of road segments, from this list of road segments, based on rank and geospatial proximity to the autonomous vehicle's current location. For example, as the autonomous vehicle prepares to enter a scheduled mapping period, the computer system can implement a costing function to select a subset of these road segments and define a sequence of navigating along these road segments that minimizes a duration of time spent by the autonomous vehicle not occupying a road segment in this subset during a mapping period and that maximizes aggregate rank of road segments traversed by the autonomous vehicle during the mapping period. The computer system can similarly rank and select a subset of road segments contracted for autonomous surveillance and incorporate these road segments into this route. The computer system can then serve this route to the autonomous vehicle for autonomous execution during the upcoming mapping period.

In another implementation, the computer system can access historical data for past ride requests within the geographic region, such as ride requests entered on the current date or all historical ride requests specifying pickup and drop-off locations contained with the autonomous vehicle's assigned geographic region. The computer system can then: predict a set of routes between pickup and drop-off locations for future ride requests within the geographic region based on these historical data for past ride requests within the geographic region; rank road segments within the geographic region based on proximity to the set of routes for these predicted future ride requests and frequency of these predicted future ride requests; assign a subset of these road segments to the autonomous vehicle based on rank of these road segments; and then dispatch the autonomous vehicle to scan this subset of road segments within the geographic region during its next mapping period. Therefore, in this implementation, the computer system can prioritize rescanning road segments most likely to intersect future routes completes by autonomous vehicles during future passenger periods within the geographic region, thereby ensuring that the localization map contains the most accurate, current representations of road segments traffic with greatest frequency by autonomous vehicles completing ride requests for riders.

For example, in the foregoing implementations, the autonomous vehicle can: autonomously transport passengers within its assigned geographic region during a passenger period within a daytime interval on a first day. The computer system can then: predict a set of routes for future ride requests within the geographic region during this same daytime interval on a second day succeeding the first day; assign a set of high-frequency road segments within these routes to the autonomous vehicle; and then dispatch the autonomous vehicle to scan the first subset of road segments within a nighttime interval between the current daytime interval on the first day and the daytime interval on the second day. The computer system can then implement methods and techniques described below to generate localization map updates based on data collected by the autonomous vehicle during this mapping period. Prior to executing a first ride request during a passenger period on the second day, the autonomous vehicle can load these localization map updates into the local copy of the localization map stored on the autonomous vehicle; the autonomous vehicle can then implement this updated localization map to determine its geospatial location and orientation while operating autonomously during this passenger period.

In a similar implementation, the computer system can aggregate a list of road segments within which changes in immutable features were detected by autonomous vehicles in the geographic region while executing recent ride requests and then implement methods and techniques similar to those described above to assign road segments in this list to the autonomous vehicle for scanning during a next mapping period. In particular, autonomous vehicles can detect changes in immutable features—such as building facades, lane markers, road signs, curbs, road surfaces, and fire hydrants—within the geographic region while execute ride requests for passengers. However, because these autonomous vehicles may have detected these changes during periods of high vehicle or pedestrian traffic or may have passed these feature changes at posted vehicle speeds, scan data collected by these autonomous vehicles during these ride requests may be relatively low-resolution. Therefore, the computer system can assign road segments near these detected changes to the autonomous vehicle for additional scanning—such as at lower road speeds or with higher-resolution sensors loaded onto the autonomous vehicle—during a next mapping period.

For example, the computer system can access scan data recorded by a fleet of autonomous vehicles during passenger periods recently executed by the fleet of autonomous vehicles and representing a set of changes in immutable features detected in the geographic region, such as described in U.S. patent application Ser. No. 16/020,905, filed on 27 Jun. 2018, which is incorporated in its entirety by this reference. The computer system can then: identify a group of road segments proximal this set of detected changes; rank road segments in this group by accessibility (e.g., proximity) to the autonomous vehicle, type of detected change, and/or magnitude of detected change; assign a subset of these road segments to the autonomous vehicle based on rank; and then dispatch the autonomous vehicle to scan these road segments during the next mapping period. Upon receipt of scan data recorded by the autonomous vehicle during this next mapping period, the computer system can: generate a set of updates for the localization map to reflect the changes in immutable features detected in the geographic region based on these scan data; and distribute these localization map updates to autonomous vehicles operating within the geographic region. These autonomous vehicles can then reference their local copies of the update localization map to track their geospatial locations and orientations during subsequent passenger and mapping periods.

Therefore, in Block S122, the computer system can aggregate historical traffic and rideshare data, data recently recorded by the same or other autonomous vehicles traversing road segments within the geographic region, known characteristics of road segments in the geographic region, and a current state of the autonomous vehicle to rank or prioritize road segments for the autonomous vehicle to scan during the current or upcoming mapping period.

6.2 Road Segments for Internal Localization Map Expansion

In one variation, the computer system assigns road segments on the periphery of the localization map for scanning by the autonomous vehicle during a next mapping cycle in order to access scan data necessary to expand the geographic area represented by the localization map. By updating the localization map based on these scan data and loading these localization map updates onto autonomous vehicles in the fleet, the computer system can enable these autonomous vehicles to derive their geospatial locations and orientations with a high degree of precision via the localization map rather than with low-resolution location services (e.g., GPS), which may enable these autonomous vehicles to operate autonomously at higher speeds and/or with greater care in these peripheral areas of the geographic region.

In one implementation, the computer system: accesses a road map of the geographic region; identifies a group of road segments represented in the road map and currently excluded from the localization map (or depicted in the localization map with insufficient data density to enable vehicle localization); and then selects a set of road segments from this group for scanning by the autonomous vehicle during its next mapping period. For example, the computer system can rank these road segments by proximity to the autonomous vehicle's current location and/or frequency of ride requests specifying pickup or drop-off locations accessed via road segments in the group; and then elect a subset of these road segments for the autonomous vehicle's next mapping period based on rank. The computer system can then generate a mapping route through this subset of road segments (e.g., based on a low-resolution road connection map rather than the localization map) and dispatch the autonomous vehicle to execute this route during a next mapping period, such as during a low-traffic period (e.g., between 3 AM and 4 AM on a Wednesday or other period in which vehicle and pedestrian traffic is predicted to be low along these road segments). During this scheduled mapping period, the autonomous vehicle can autonomously navigate along this route at a reduced speed (e.g., 10 miles per hours), implement computer vision techniques to detect lane markers, access a coarse estimate of its location from a geospatial position service, and execute navigational actions that maintain the autonomous vehicle between these lane markers and near the planned route based on these coarse location estimates while concurrently recording scan data of these road segments and scenes nearby. Later, the computer system can: access scan data collected by the autonomous vehicle during this mapping period; implement computer vision, deep learning, artificial intelligence, and/or other techniques to identify objects in scan data recorded by the autonomous vehicle during this mapping period; generate a set of updates—such as in the form of groups of color point clouds associated with object type labels—that extend the localization map to represent these road segments and nearby objects; and upload these localization map updates to autonomous vehicles in this geographic region.

Furthermore, once these autonomous vehicles load these localization map updates into their local localization maps, the computer system can automatically authorize these autonomous vehicles to fulfill ride requests specifying pickup or drop-off locations along these road segments now represented in the extended localization map. For example, after capturing scan data along these peripheral road segments during a mapping period and then loading the resulting localization map updates into its local copy of the localization map, the autonomous vehicle can execute a next ride request routed through these peripheral road segments, including autonomously transporting a passenger along one of these road segments by: recording a depth map representing surfaces proximal the autonomous vehicle; extracting a constellation of features from the depth map; calculating a geospatial location and orientation of the autonomous vehicle that aligns the constellation of features with corresponding features contained in a local copy of the localization map (i.e., rather than retrieving a coarse location estimate from a geospatial position service); electing a next navigational action based on the geospatial location and orientation of the autonomous vehicle and a destination specified by the passenger; autonomously executing the next navigational action; and repeating this process throughout completion of this ride request, such as at a rate of 20 Hz.

Therefore, in this variation, the computer system and the autonomous vehicle can cooperate to collect scan data along unmapped road segments or undermapped road segments within a geographic region in order to extend the localization map and enable autonomous execution of ride requests through these road segments within the geographic region.

6.3 Road Segments for Existing Surveillance Requests

Additionally or alternatively, the computer system can assign road segments to the autonomous vehicle for scanning during a next mapping period based on pending surveillance or data capture requests from external entities, as shown in FIG. 2.

In one implementation, the computer system: retrieves monitoring requests—each submitted previously by an external entity and specifying particular road segment for autonomous monitoring—such as from a database of pending external surveillance requests. The computer system then ranks road segments—specified in these monitoring requests—based on: spatial proximity of corresponding road segments to the autonomous vehicle; spatial proximity of corresponding road segments to other road segments assigned to the autonomous vehicle for internal localization map updates; temporal proximity of the upcoming mapping period at the autonomous vehicle to time sensitivities or time windows specified in these monitoring requests; and/or age of these monitoring requests; etc. The computer system then selects a subset of these monitoring requests to assign to the autonomous vehicle, such as a combination of monitoring requests from external entities and road segments for internal localization map updates: that minimizes a duration of time spent by the autonomous vehicle not occupying a road segment in this subset during a mapping period; and that maximizes aggregate rank of road segments traversed by the autonomous vehicle during the next mapping period. Accordingly, the computer system can: generate a mapping route through these road segments for data capture for internal and external services; upload this mapping route to the autonomous vehicle; and dispatch the autonomous vehicle to navigate autonomously along this mapping route and capture scan data along these road segments during the next mapping period in Block S120.

6.4 Examples

In one application, the autonomous vehicle is assigned or dedicated to a residential community, such as a subdivision of single- or multi-family homes or a retirement community. Generally, in this application, the autonomous vehicle can function to transport residents of the residential community between various locations inside the residential community and/or to transport these residents into and out of the residential community. For example, the autonomous vehicle can be installed in a gated community as a free or subsidized rideshare option for residents of the community. In this application, in addition to parameters described above, the computer system can prioritize access to current scan data for road segments within the residential community and thus prompt the autonomous vehicle to scan road segments within the residential community during a mapping period before scanning road segments beyond the residential community. The computer system can also: specify a maximum duration of time between scans of road segments within the residential community, such as two days or proportional to a frequency with which autonomous vehicles traverse these road segments while executing recent passenger periods; specify a longer maximum duration of time between scans of road segments outside the residential community; and prioritize these road segments for scanning during the autonomous vehicle's next mapping period accordingly. The computer system can then dispatch the autonomous vehicle to autonomously navigate to road segments inside the residential community according to their assigned priorities in Block S130 and collect sensor data while traversing these road segments in Block S132.

In the foregoing application, once the autonomous vehicle has traversed and scanned road segments within the residential community, the autonomous vehicle can then autonomously navigate and record scan data along prioritized road segments outside of the residential community, such as with these external road segments prioritized: by proximity to the residential community; by frequencies with which autonomous vehicles have traversed these road segments while during passenger periods in the past; and/or based on changes in immutable features along these road segments detected by autonomous vehicles in the fleet during these recent passenger periods; etc., such as described above.

In a similar application, the autonomous vehicle is assigned or dedicated to a school or business campus. Generally, in this application, the autonomous vehicle can function to transport students or employees between various locations within the campus and/or to transport these students or employees onto and off of the campus (e.g., to and from meetings, between their homes and offices). In this application, the computer system can implement methods and techniques similar to those described above to prioritize current scan data for road segments within the campus and to assign lower priorities to road segments at greater distances from the campus. The computer system can then dispatch the autonomous vehicle to selectively navigate and to record scan data along these road segments during a current or subsequent mapping period based on priorities assigned to these road segments.

Alternatively, the computer system can assign a geographic area (e.g., a one-half-kilometer-square ground area) within the geographic region to the autonomous vehicle and queue the autonomous vehicle to navigate and collect scan data along every known road within this assigned geographic area during the next mapping period.

However, the autonomous vehicle can be installed or assigned to any other entity or location or operated in a geographic region in any other way. The computer system can also prioritize collection of new scan data by the autonomous vehicle in any other way in Block S122.

7. Localization Map Updates

Block S132 of the method S100 recites, at the autonomous vehicle, recording scan data of surfaces proximal the set of road segments during the mapping period; and Block S150 of the method S100 recites, at the autonomous vehicle, returning the scan data to the computer system. Block S160 of the method S100 recites, at the computer system, updating a localization map for the geographic region based on the scan data received from the autonomous vehicle and returning updates for the localization map to the autonomous vehicle. Generally, in Block S132, the autonomous vehicle can record scan data while traversing road segments of interest in Block S130 and can then offload these scan data to the computer system in Block S150, such as in real-time or upon conclusion of the mapping period. In Block S160, the computer system can update a localization map based on these new scan data and then push localization map updates back to the autonomous vehicle for use during a subsequent passenger period, as shown in FIGS. 2 and 3.

In one implementation, while navigating along road segments during a mapping period in Block S130, the autonomous vehicle can record a LIDAR feed, a video feed, and/or other data from various sensors in the autonomous vehicle and store these scan data in local memory. The autonomous vehicle can then offload these high-resolution scan data to the computer system once the autonomous vehicle has concluded this mapping period, returned to its assigned parking space, and/or connected to a high-bandwidth wireless network. Alternatively, the autonomous vehicle can stream these scan data to the computer system in (near) real-time, such as over a cellular network, while executing the mapping period. However, the autonomous vehicle can return scan data recorded during this mapping period in any other way and responsive to any other triggers.

In Block S160, the computer system can then update a localization map (and/or a path-planning map) for the geographic region based on new scan data received from the autonomous vehicle and from other autonomous vehicles that recently performed mapping periods within the geographic region. In particular, the computer system can interface with many other autonomous vehicles in the fleet to collect new scan data representing many road segments of interest throughout the geographic region simultaneously and over time and then update the localization map (and/or the path-planning map) based on these new scan data.

The computer system can then push the updated localization map in its entirety or select, updated regions of the localization map to all autonomous vehicles in the fleet. Alternatively, for the autonomous vehicle, the computer system can: isolate a subregion of the geographic region in which the autonomous vehicle commonly operates, such as a circular area with a radius of 25 miles and centered at a known home or assigned parking location of the autonomous vehicle; and then push a segment of the updated localization or updated regions of the localization map within this subregion of the geographic region to the autonomous vehicle. During subsequent operation—such as when completing a rideshare trip with this geographic region—the particular autonomous vehicle can then compare data collected by optical sensors on the autonomous vehicle to this updated localization map—stored locally on the autonomous vehicle—in order to determine its location and orientation in real space.

The computer system can similarly push localization map updates to other autonomous vehicles in the fleet, thereby providing these autonomous vehicles with localization (and/or path planning) data that is substantially up to date and that generally represents a "true" state of a geographic region in which these autonomous vehicles operate autonomously, thereby enabling each of these autonomous vehicles to transform features detected in its vicinity into a position and orientation of the autonomous vehicle in real space with greater accuracy, repeatability, and confidence.

Therefore, the computer system can leverage scan data (e.g., color images, depth maps, and/or RADAR data) collected by one autonomous vehicle while traversing select road segments during a mapping period within a geographic region in order to update a localization map to reflect a current state of these select road segments. The computer system can then push an updated localization map or specific updates within this localization map to the autonomous vehicle and other autonomous vehicles operating in the geographic region in order to improve geospatial location accuracy and improve operation of these autonomous vehicles when transporting passengers along these road segments.

8. Ad Hoc/Unscheduled Data Distribution to External Entities

While the autonomous vehicle autonomously navigates along road segments of interest—selected for additional data capture by the computer system in Block S122 described above—and records new scan data of these road segments and nearby features in Blocks S130 and S132, the autonomous vehicle may also record scan data that is useful to external entities and can selectively serve these scan data to such external entities accordingly in Block S140. Similarly, the autonomous vehicle may navigate near road segments, locations, or landmarks of interest to an external entity while executing a mapping period in Blocks S130 and S132; accordingly, the autonomous vehicle and/or the computer system can modify the autonomous vehicle's route in real-time to move the autonomous vehicle closer to these road segments, locations, or landmarks of interest and then serve these scan data to the corresponding entity. For road segments, locations, or landmarks specified to be of interest to an external entity prior to a mapping period, the computer system can also inject these road segments or update a route assigned to the autonomous vehicle to reflect the interests of this external entity and can then cooperate with the autonomous vehicle to collect scan data from these areas and to serve these scan data to this external entity.

8.1 Emergency Event

In one implementation shown in FIG. 3, the autonomous vehicle implements a neural network or other model trained to detect emergency events—such as traffic accidents or building fires—in LIDAR and/or video feeds. While recording LIDAR and/or video feeds (i.e., scan data) during a mapping period, the autonomous vehicle can pass these scan data through the neural network or other model to check for an emergency event. Upon detecting a possible emergency event nearby, the autonomous vehicle can automatically: transmit its location or an estimated location of the possible emergency event to an emergency dispatcher; serve (e.g., stream) scan data recorded near the possible emergency event to the emergency dispatcher; and serve a prompt to the emergency dispatcher to investigate these scan data to confirm the emergency event.

For example, the autonomous vehicle can stream these data to the emergency dispatcher over a cellular network. A human representative of the emergency dispatcher can then view these data in near real-time to determine whether an emergency event has or is occurring and then dispatch an emergency responder accordingly. The autonomous vehicle can thus capture data that may enable a human at the emergency dispatcher to identify and confirm an emergency event. By serving these data to the emergency dispatcher in (near) real-time, the autonomous vehicle can enable the emergency dispatcher to rapidly dispatch an emergency responder to the location of the emergency event.

In this implementation, the emergency dispatcher can also return confirmation of the emergency event or a request for additional scan data to the autonomous vehicle. Upon receipt of such confirmation or request, the autonomous vehicle (or the computer system) can modify its current route: to encircle the location of the emergency event; to stop near the location of the emergency event; or to again navigate past the location of the emergency event. The autonomous vehicle can then return these additional scan data proximal the emergency event to the emergency dispatcher, thereby enabling the emergency dispatcher to access additional information about the emergency event or to view the emergency event from a different perspective. For example, by continuing to record scan data of a traffic accident and streaming these scan data to the emergency dispatcher, the autonomous vehicle can enable the human at the emergency dispatcher to: determine a severity of the accident; predict the extent of human injuries; to predict types of equipment needed to manage the emergency event (e.g., tow trucks, helicopters for medical evacuation); estimate a number of paramedics, ambulances, police officers, and tow trucks needed to manage the traffic accident; and then dispatch emergency responders to the location of the emergency event accordingly.

In Block S140, the autonomous vehicle can therefore detect a possible emergency event and then function as "eyes" for a remote emergency dispatcher tasked with dispatching emergency responders. The autonomous vehicle can also stream these scan data to emergency responders dispatched to the detected emergency event (or the computer system or the emergency dispatcher can reroute these scan data to these emergency responders) in Block S140.

Once the emergency dispatcher and/or emergency responders defer additional scan data of the emergency event, once the autonomous vehicle detects arrival of emergency responders near the location of the emergency event, or if the emergency dispatcher disclaims the emergency event, the autonomous vehicle can resume its preplanned route for the remainder of the current mapping period.

(The autonomous vehicle can implement similar methods and techniques during or between passenger periods, as described below.)

8.2 Emergency Dispatch Event

In another implementation shown in FIG. 3, the computer system: tracks locations of autonomous vehicles throughout the geographic region; monitors an emergency dispatch feed for locations of emergency events; identifies a particular autonomous vehicle currently executing a mapping period near a location of an outstanding or current emergency event indicated in the dispatch feed; and then reroutes the particular autonomous vehicle to navigate near this location.

Then, as the particular autonomous vehicle nears this location, the autonomous vehicle can stream scan data to an emergency dispatcher or to an emergency responder assigned to this emergency event, thereby enabling the emergency dispatcher or emergency responder to view the emergency event prior to arrival. For example, for a building fire, the autonomous vehicle can stream scan data of the building to the emergency dispatcher or directly to fire fighters prior to their arrival at the building, thereby enabling these fire fighters to determine a type and size of the fire, to gather necessary tools and equipment to fight the fire before leaving the fire station, and/or to rapidly request assistance from other fire units even before arriving at the location of the fire.

Therefore, the computer system can dynamically reroute an autonomous vehicle—executing a mapping period—to a location of a known emergency event in order to collect scan data of this location, stream these data to emergency personnel in (near) real-time, and thus act as "eyes" for these emergency personnel.

Once the emergency dispatcher and/or emergency responders defer additional scan data of the emergency event or once the autonomous vehicle detects arrival of emergency responders near the location of the emergency event, the autonomous vehicle can resume navigation along the remainder of its preplanned route for the current mapping period.

In a similar example, the computer system can: track locations of autonomous vehicles in the fleet within the geographic region; monitor an emergency dispatch feed for locations of known or indicated emergency events in the geographic region; identify a particular autonomous vehicle—in the fleet—currently executing a mapping period near a particular location associated with a new or ongoing emergency event identified in the dispatch feed; and identify a set of road segments near this particular location (e.g., a section of road nearest the particular location, a 100-meter-long road segment facing the particular location). The computer system can then assign this set of road segments to the autonomous vehicle and reroute the autonomous vehicle to this set of road segments. Once the autonomous vehicle reaches the road segment(s) facing the particular location of the emergency event, the autonomous vehicle can: stop near this particular location; and stream scan data depicting the particular location to an emergency responder affiliated with this emergency dispatch feed, such as an emergency dispatcher or to an emergency responder directly. The autonomous vehicle can also move to different locations along this road segment responsive to commands or live requests from the emergency dispatcher or emergency responder and thus return scan data of the emergency event from a different perspective. Later, once the emergency responder disengages the autonomous vehicle (e.g., upon conclusion of the emergency event), the autonomous vehicle can resume autonomous navigation and data collection along road segments specified for localization map updates, such as described above.

8.3 Autonomous Patrol

In another implementation shown in FIG. 2, autonomous vehicles executing mapping periods within a geographic region record scan data and stream these scan data to a remote patrol center to enable remote staff (e.g., police) to remotely patrol this geographic region. For example, a fleet of autonomous vehicles simultaneously executing mapping periods can stream their scan data back to the computer system in (near) real-time, and the computer system can serve data feeds (e.g., LIDAR and/or video feeds) from these autonomous vehicles to a small number of patrol portals operated and observed by a small number of police officers or monitors, thereby enabling this small number of police officers or monitors to patrol a relatively large geographic region through this fleet of autonomous vehicles. If a police officer or monitor detects suspicious or criminal activity in a data feed from a particular autonomous vehicle in the fleet and flags this video feed in her patrol portal, the computer system can flag to the particular autonomous vehicle to stop or encircle the location of this activity while continuing to stream scan data to the patrol portal. Alternately, if the police officer or monitor detects suspicious or criminal activity in this data feed, the computer system can activate remote control of the particular autonomous vehicle to enable the police officer or monitor to assume (some) control of the autonomous vehicle, such as to modify a route of the autonomous vehicle or to speak through an intercom integrated into the autonomous vehicle.

In this implementation a police force or other law enforcement authority can supply a list of prioritized road segments for remote monitoring; and the computer system can generate mapping period routes for autonomous vehicles in the fleet based on this list of prioritized road segments in addition to factors described above. Autonomous vehicles executing these routes can thus collect both: scan data for generating high-value updates of the localization map; and scan data to enable the police force or other law enforcement authority to remotely monitor targeted road segments (e.g., road segments exhibit high historical incidences of criminal activity) during mapping periods.

In a similar implementation, an autonomous vehicle is installed in or assigned to a campus and streams scan data to security personnel associated with the campus. In one example, campus administrators supply a list of prioritized road segments within the campus for heightened monitoring; and the computer system generates a mapping period route—for the autonomous vehicle—that includes both these externally-specified road segments and road segments designated internally by the computer system as necessitating new scan data. The autonomous vehicle can then execute this route during a mapping period to enable security personnel associated with the campus to remotely monitor these prioritized road segments and to collect scan data needed by the computer system to update the localization map.

Additionally or alternatively, the computer system can: select a first subset of road segments—from known roads segments throughout the campus—associated with autonomous vehicles operating on the campus; retrieve a second list of road segments—within the campus—designated for autonomous surveillance during a surveillance interval by campus administrators; generate a mapping route across this first subset of road segments and this second list of roads segments, such as a mapping route that limits absent time from each road segment in the second list of road segments to less than a predefined time interval (e.g., fifteen minutes) during a mapping period; and then assign this mapping route to the autonomous vehicle during its next mapping period. Accordingly, the autonomous vehicle can: transition from a passenger period in which the autonomous vehicle moves students or employees throughout the campus into a mapping period at a start of the designated surveillance interval; and autonomously execute the mapping route; capture scan data—of road segments in both the first subset and the second list of road segments within the campus—during this mapping period. The autonomous vehicle can also selectively stream scan data (e.g., a color video feed) captured while traversing road segments in this second list to campus security personnel in Block S140. Alternately, the autonomous vehicle can implement computer vision, artificial intelligence, deep learning, and/or other methods and techniques to detect a security event (e.g., fire, an attempted burglary, an altercation, a group of pedestrians in excess of six) in scan data recorded along this second list of road segments, such as described above, and then selectively stream scan data of these security events to security personnel when a security event is detected. Therefore, in this example, the autonomous vehicle can collect scan data for both localization map updates and surveillance of the campus during on mapping period.

In another implementation, an autonomous vehicle is installed in or assigned to a residential community and streams scan data to security personnel associated with the community. In one example, residents within the community bid or purchase heightened security near their properties. The computer system then generates a mapping period route—for the autonomous vehicle—that includes: road segments designated internally by the computer system as necessitating new scan data; and a number of instances passing each property within the community approximately proportional to bids or purchases received by corresponding residents. The autonomous vehicle then executes this route during a mapping period to enable security personnel associated with the community to remotely monitor these properties at a rate approximately proportional to bids or purchases made by corresponding residents.

Therefore, in this example, the computer system can: retrieve a list of road segments within the community; rank these road segments based on auctioned rates for surveillance of properties proximal these road segments, such as based on bids for surveillance entered by individual community residents, by security personnel, or by a home owner's association affiliated with the community; select a set of road segments—from the list of road segments—based on rank; and then generate a mapping route that contains this set of road segments and a separate set of road segments designated for updating in the localization map of the community. Alternatively, the computer system can generate a mapping route for the community in which road segments facing individual properties are surveilled by the autonomous vehicle at a frequency during a mapping period proportional to auctioned rates submitted or surveillance time purchased by community residents. Later, the autonomous vehicle can transition into a mapping period during a scheduled interval or transition into a mapping period in the absence of pending ride requests originating within the community (e.g., if the autonomous vehicle is idle for more than a threshold duration of time, such as five minutes). The autonomous vehicle can then autonomously navigate along the mapping route and return raw scan data to security personnel affiliated with the community according to surveillance requests associated with properties depicted in these scan data.

In yet another implementation, the autonomous vehicle is installed in or is contracted with a mall (e.g., a strip mall) and implements similar methods and techniques to autonomously collect scan data around the mall and to return these scan data to security personnel. These security personnel can then leverage these scan data to remotely monitor the area around the mall and to rapidly address possible criminal activity nearby.

8.4 Street Parking Monitoring

In another implementation, a government entity, municipality, or campus, etc. contracts the computer system to count street parking along a particular road segment, such as on a singular date or on regular monthly, weekly, daily, or hourly intervals. The computer system can then generate a mapping period route for an autonomous vehicle that: intersects this particular road segment at the frequency specified by the government entity, etc.; and incorporates road segments selected or prioritized by the computer system in Block S122, as described above. The computer system can then serve this route to the autonomous vehicle, and the autonomous vehicle can execute this route during a next mapping period. When traversing the particular road segment, the autonomous vehicle can pass scan data through a local neural network or other model—trained to detect open parking spaces and parked cars—in order to generate a map or table of open parking spaces and parked cars along the particular road segment. Alternatively, the computer system can implement this neural network or other model to remotely derive these parking data upon receipt of scan data from the autonomous vehicle. The computer system can then package and serve these parking data for the particular road segment to the government entity, municipality, or campus, etc.

8.5 Pedestrian Traffic Monitoring

In a similar implementation, a government entity or municipality contracts the computer system to monitor pedestrian traffic along a particular road segment, such as on a singular date of a scheduled event (e.g., a concert) or over a period of time (e.g., daily over a period of two weeks following installation of a homeless encampment). The computer system can then generate a mapping period route for an autonomous vehicle that: intersects this particular road segment at the frequency specified by the government entity or municipality; and incorporates road segments selected or prioritized by the computer system in Block S122, as described above. The computer system can then serve this route to the autonomous vehicle, and the autonomous vehicle can execute this route during a next mapping period. When traversing the particular road segment, the autonomous vehicle can pass scan data through a local neural network or other model—trained to detect pedestrians—in order to generate: a static map of pedestrians or crowds; a static count of pedestrians or crowd size; or a map of pedestrian or crowd flow; etc. along the particular road segment. Alternatively, the computer system can implement this neural network or other model to remotely derive these pedestrian data upon receipt of scan data from the autonomous vehicle. The computer system can then package and serve these pedestrian data for the particular road segment to the government entity or municipality.

In this implementation, the computer system can also reroute a nearby autonomous vehicle to a location of an impromptu rally or protest, such as in real-time in response to receipt of a request from a government entity or law enforcement authority to monitor pedestrians at this impromptu event. Accordingly, the autonomous vehicle can navigate to the indicated location of this event, record scan data of the event, and stream these scan data to the government entity or law enforcement authority in (near) real-time, thereby enabling a representative of the government entity or law enforcement authority to remotely monitor the event. Once the representative of the government entity or law enforcement authority defers or disables additional scan data of the event or once the event ceases, the autonomous vehicle can resume its preplanned route for the remainder of the current mapping period.

In a similar implementation, the computer system can (re)route the autonomous vehicle to a road segment associated with an existing or ad hoc monitoring request specifying pedestrian, cyclist, and vehicle tracking. For example, a city planner may request such monitoring by the autonomous vehicle fleet in order to assist with proposals related to adding bicycle lanes, moving bus stops, widening sidewalks, and controlling or reducing vehicle traffic. In this implementation, the autonomous vehicle can implement computer vision, artificial intelligence, deep learning, and/or other controls to locally process scan data—recorded by the autonomous vehicle while traversing a road segment designated for surveillance—in order to detect locations of pedestrians, cyclists, and parked vehicles along this road segment. The autonomous vehicle (or the remote computer system) can then generate a schedule of georeferenced pedestrian, cyclist, and parked vehicle locations, orientations, and/or trajectories proximal this road segment and then serve this schedule to the external entity (e.g., the city planner).

8.6 Debris Detection and Trash Collection

In another implementation, a government entity, municipality, or campus, etc. contracts the computer system to monitor trash and debris along a particular road segment, such as on a singular date (e.g., following a scheduled event, such as a concert or sports game) or on regular monthly, weekly, daily, or hourly intervals. The computer system can then generate a mapping period route for an autonomous vehicle that: intersects this particular road segment at the frequency specified by the government entity, etc.; and incorporates road segments selected or prioritized by the computer system in Block S122, as described above. The computer system can then serve this route to the autonomous vehicle, and the autonomous vehicle can execute this route during a next mapping period. When traversing the particular road segment, the autonomous vehicle can pass scan data through a local neural network or other model—trained to detect trash and debris on roads and sidewalks—in order to generate a map or metric of debris along and near the particular road segment. Alternatively, the computer system can implement this neural network or other model to remotely derive these debris data upon receipt of scan data from the autonomous vehicle. The computer system can then package and serve these debris data for the particular road segment to the government entity, municipality, or campus, etc. Yet alternatively, the autonomous vehicle or computer system can serve scan data—recorded by the autonomous vehicle while traversing the particular road segment—to a representative of the government entity, etc., who can then manually extract qualitative or quantitative debris data from these scan data. The government entity, etc. can then selectively contract trash removal and/or street cleaning services based on these debris data collected by the autonomous vehicle and computer system.

Therefore, in this implementation, the computer system can assign a subset of road segments—associated with a pending monitoring request specifying debris tracking—to the autonomous vehicle for a next mapping period. During this next mapping period, the autonomous vehicle can: traverse these road segments specified in the pending monitoring request; capture scan data (e.g., 2D color images) depicting these road segments and scenes nearby; implement computer vision, artificial intelligence, deep learning, and/or other controls to locally process these scan data to detect debris proximal these road segments; generating a schedule or map of georeferenced debris locations, debris types (e.g., bottles, paper goods, boxes, furniture), and debris densities proximal these road segments; and then serve this schedule or map to a corresponding external entity (e.g., a street cleaning service, a sidewalk cleaning service, city planning) to support short-term decisions regarding deployment of resources to clean these road segments and long-term decisions regarding reduction of litter.

However, an autonomous vehicle and the computer system can cooperate in any other way to selectively record and distribute scan data—representing certain road segment areas, or events within a geographic region—to select external entities in Block S140 during a mapping period.

8.7 Transient Requests

In another implementation shown in FIG. 3, the autonomous vehicle selectively navigates to a targeted road segment near locations of interest specified in ad hoc, transient surveillance requests entered by an external entity, records scan data along this targeted road segment, and returns these raw scan data or metrics derived from these raw scan data to the external entity. For example, in this implementation, the computer system can receive a request for transient surveillance of a particular geospatial location (e.g., a patio of a busy brunch location, a line outside of a shoe store just prior to the release of a new shoe, a line outside of an electronics store just prior to the release of a new smartphone) from an external entity (e.g., an individual preparing to leave her house for brunch, an individual preparing to wait in-line for the show, a journalist covering the new smartphone) at a first time. The computer system can then implement methods and techniques described above: to identify an autonomous vehicle proximal the particular geospatial location and currently executing a mapping period; and to dispatch the autonomous vehicle to transition from scanning road segments for scheduled localization map updates to surveilling the particular geospatial location according to the surveillance request. The autonomous vehicle can capture scan data according to the surveillance request upon arrival at the road segment nearby, such as a static image or a video clip of the particular geospatial location, and then return these scan data to the external entity (e.g., via a data access portal accessed through a native application or web browser executing on the individual's smartphone or tablet). Additionally or alternatively, the autonomous vehicle can locally process these scan data, as described above, to detect pedestrians and/or other objects proximal the particular geospatial location according to data types specified in the surveillance request; generating a count of pedestrians and/or other specified objects proximal the particular geospatial location; and then serving this pedestrian count and/or object count to the external entity (e.g., via the data access portal), such as within minutes of initial receipt of the surveillance request.

Therefore, in this implementation, the computer system and the autonomous vehicle can cooperate to enable an external entity to access color images, video clips, a live video stream, or derived statistics of a particular geospatial location in near real-time by redirecting the autonomous vehicle to a road segment near the particular geospatial location and routing scan data or derived data from the autonomous vehicle back to this external entity.

9. Scan Data Distribution During Passenger Periods

In one variation, the autonomous vehicle implements similar methods and techniques to collect scan data and to selectively offload these scan data to various external entities while performing passenger periods, such as when a rider is present inside the autonomous vehicle and/or while the autonomous vehicle is autonomously navigating to a pickup location specified in a next ride request. For example, the automatically recalculate its route from its current location to a destination specified by its current occupant: in order to navigate near and collect traffic accident data for immediate distribution to emergency responders; or in order to navigate past and to collect data of a gathering crowd on behalf of a government entity. However, the autonomous vehicle can also automatically recalculate its route to the destination specified by its current occupant in order to avoid locations of known dangers identified by external entities, such as a violent crime scene or a large building fire.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for updating a localization map, the method comprising:
   identifying a set of road segments located within a geographic region, the set of road segments associated with incomplete scan data for the localization map;
   receiving a ride request for transporting a passenger from an origin to a destination;
   identifying a mapping period based on the ride request and the geographic region;
   dispatching a vehicle to scan the set of road segments during the mapping period;
   and
   obtaining scan data corresponding to the set of road segments, the scan data captured by at least one vehicle sensor in connection with the ride request and during the mapping period, wherein one or more updates for the localization map are generated based on the scan data.

2. The method of claim 1, wherein the one or more updates for the localization map is distributed to one or more other vehicles operating relative to the geographic region.

3. The method of claim 1, further comprising:
   dispatching the vehicle to transport the passenger from the origin to the destination during a passenger period in connection with the ride request, wherein the mapping period is at least one of subsequent to or prior to the passenger period.

4. The method of claim 1, further comprising:
   identifying the incomplete scan data.

5. The method of claim 4, wherein the incomplete scan data is identified based on a group of road segments represented in a road map of the geographical region and excluded from the localization map.

6. The method of claim 1, wherein the set of road segments is identified based on a proximity to a route from the origin to the destination.

7. The method of claim 1, wherein the set of road segments is identified based on a prediction of a set of routes for ride requests within the geographic region prior to the ride request being received.

8. The method of claim 1, wherein a time window for the mapping period is concurrent with times of low historical pedestrian and vehicle occupancy within the set of road segments.

9. The method of claim 1, wherein the set of road segments is identified based on second scan data recorded by a second vehicle operating in the geographic region, the scan data indicating one or more changes in features detected in the geographic region.

10. The method of claim 1, wherein the set of road segments is identified based on a particular location associated with an emergency event.

11. One or more tangible non-transitory computer-readable storage media storing computer-executable instructions for performing a computer process on a computing system, the computer process comprising:
- identifying a set of road segments located within a geographic region and corresponding to a mapping period, the set of road segments associated with incomplete scan data for a localization map; and
- receiving a ride request for transporting a passenger from an origin to a destination during a passenger period;
- dispatching a vehicle to scan the set of road segments during the mapping period;
- obtaining scan data corresponding to the set of road segments, the scan data captured by at least one vehicle sensor in connection with the ride request and during the mapping period; and
- generating one or more updates for the localization map based on the scan data.

12. The one or more tangible non-transitory computer-readable storage media of claim 11, further comprising:
- sending the one or more updates to one or more other vehicles operating in the geographical region.

13. The one or more tangible non-transitory computer-readable storage media of claim 11, wherein the mapping period is subsequent to a completion of the passenger period.

14. The one or more tangible non-transitory computer-readable storage media of claim 13, wherein the mapping period automatically follows the completion of the passenger period in response to an absence of current ride requests originating within a threshold distance of the vehicle.

15. The one or more tangible non-transitory computer-readable storage media of claim 11, wherein the scan data is captured during the mapping period prior to the ride request being received, the vehicle being dispatched to the origin in response to the ride request.

16. The one or more tangible non-transitory computer-readable storage media of claim 11, wherein the set of road segments is identified based on a prediction of a set of routes for future ride requests in the geographical region prior to the ride request being received.

17. The one or more tangible non-transitory computer-readable storage media of claim 11, further comprising:
- dispatching the vehicle in response to the ride request, the scan data being captured in connection with the ride request.

18. The one or more tangible non-transitory computer-readable storage media of claim 11, wherein the incomplete scan data is identified based on scan data captured by a second vehicle operation in the geographical region.

19. The one or more tangible non-transitory computer-readable storage media of claim 11, wherein the mapping period is identified based on at least one of historical pedestrian activity or historical vehicle activity along the set of road segments.

20. The one or more tangible non-transitory computer-readable storage media of claim 11, wherein the set of road segments are identified based on a proximity to a route from the origin to the destination.

* * * * *